(12) United States Patent
Engelhart

(10) Patent No.: US 6,934,530 B2
(45) Date of Patent: Aug. 23, 2005

(54) VIRTUAL SUBSCRIBER NETWORK

(75) Inventor: Robert L. Engelhart, Redmond, WA (US)

(73) Assignee: AT&T Wireless Services, Inc., Redmond, WA (US)

( * ) Notice: Subject to any disclaimer, the term of this patent is extended or adjusted under 35 U.S.C. 154(b) by 81 days.

(21) Appl. No.: 10/259,558

(22) Filed: Sep. 25, 2002

(65) Prior Publication Data

US 2004/0203580 A1 Oct. 14, 2004

(51) Int. Cl.[7] .................. H04M 3/00; H04M 11/00; H04M 1/00; H04B 1/38
(52) U.S. Cl. ............... 455/406; 455/414.3; 455/419; 455/566; 379/122; 379/201.04; 379/201.12
(58) Field of Search ............................. 455/406, 407, 455/408, 418, 414.3, 419, 403, 566, 111, 114.01, 121.01, 201.01, 201.04, 201.12; 379/111, 114.01, 121.01, 201.01, 201.04, 201.12, 201.2, 121.02, 122

(56) References Cited

U.S. PATENT DOCUMENTS

| | | | | |
|---|---|---|---|---|
| 6,363,411 B1 | * | 3/2002 | Dugan et al. | 709/202 |
| 6,430,276 B1 | * | 8/2002 | Bouvier et al. | 379/121.01 |
| 6,522,883 B2 | * | 2/2003 | Titmuss et al. | 455/445 |
| 6,526,275 B1 | * | 2/2003 | Calvert | 455/418 |
| 6,621,895 B1 | * | 9/2003 | Giese | 379/201.03 |
| 6,628,934 B2 | * | 9/2003 | Rosenberg et al. | 455/411 |
| 6,636,590 B1 | * | 10/2003 | Jacob et al. | 379/114.05 |
| 6,836,652 B2 | * | 12/2004 | Arima et al. | 455/407 |

* cited by examiner

Primary Examiner—Binh Tieu
(74) Attorney, Agent, or Firm—Klarquist Sparkman, LLP

(57) ABSTRACT

A user device (e.g., a mobile telephone) communicates with an access node in a manner that causes the access node to provide call control and service options available through the access node. The capability and cost information is presented to a user device subscriber. The user device communicates to the access node a selection of call control and service options to use with the device.

20 Claims, 9 Drawing Sheets

VIRTUAL SUBSCRIBER NETWORK

FIELD

This disclosure relates to communication networks, and more particularly to communication networks providing user selection of network access, control or services.

BACKGROUND

The telecommunications (telecom) industry today, and particularly the wireless telecom industry, is characterized by numerous proprietary systems operated by different telecom service providers. Each proprietary system typically provides access points to the network.

Access points, also referred to herein as access nodes, comprise equipment to provide communication access to the network. For example, access nodes for wireless telephones may comprise General Packet Radio Server (GPRS) towers and antennae. Access points for terrestrial (so called 'landline' communications) may comprise Digital Subscriber Line (DSL) technology, cable modems, so-called WiFi (IEEE 802.11b compliant) technology, or Plain Old Telephone Service (POTS).

Telecom providers also provide call control functions. Call control functions comprise establishing and terminating a connection between two or more devices or other end points of a call. Call control functions also comprise establishing a quality of service (QoS) for a communication session. Quality of service includes voice quality, data quality, and kilobits per second of data transfer. Session Initiation Protocol (SIP) compliant equipment may be employed for call control for communications utilizing the Internet Protocol (IP). Other types of call control equipment include Mobile Switching Centers (MSC) for wireless communication, PSTN switching centers, and Serving GPRS Support Node (SGSN) equipment for GPRS calls. A call control 'node' comprises one or more items of equipment to perform call control.

Telecom providers also provide communication services. Services include features provided beyond mere call control, such as voice mail, email, stock quotes, web browsing, video streaming, virtual private networks (VPNs), and so on. Service equipment may vary according to the service provided. A service 'node' comprises one or more items of equipment to provide one or more services.

The nodes of different telecom providers may interoperate to provide access, call control, and services across a wide geographic area. For example, a wireless telephone, when roaming to a geographic location distant from its home location, may employ the access node of a different provider than the one the phone is subscribed to. When placing a wireless phone call from a home location to a distant location, call control nodes of both the home provider and a different service provider may be employed to complete the connection to the target of the call. However, the wireless subscriber (the person operating the wireless phone) typically does not have a choice as to which provider's access, call control, and service equipment are employed in such circumstances. The choice is typically made according to pre-arranged defaults (e.g. pre-arrangements between providers as to which access nodes will operate with the subscriber's wireless device when roaming, which call control nodes to employ when placing calls between provider networks, etc.). Furthermore, the services that the subscriber can access, whether roaming or otherwise, are typically limited by the service plan to which they subscribe and by the equipment of the subscription provider.

Default selection of access, call control, and service nodes may provide less than optimal cost, service, and quality benefits to the subscriber.

SUMMARY

A user device (e.g., a mobile telephone) communicates with access nodes in a manner that causes the access nodes to provide capability and cost information on available call control and service options. The capability and cost information is presented to a user device. The user device communicates to one of the access nodes a selection of call control and service options to use with the user device.

DESCRIPTION

References to 'a' or 'an' embodiment do not necessarily refer to the same embodiment, although they may. Like references in the figures refer to like elements.

Figure 1:
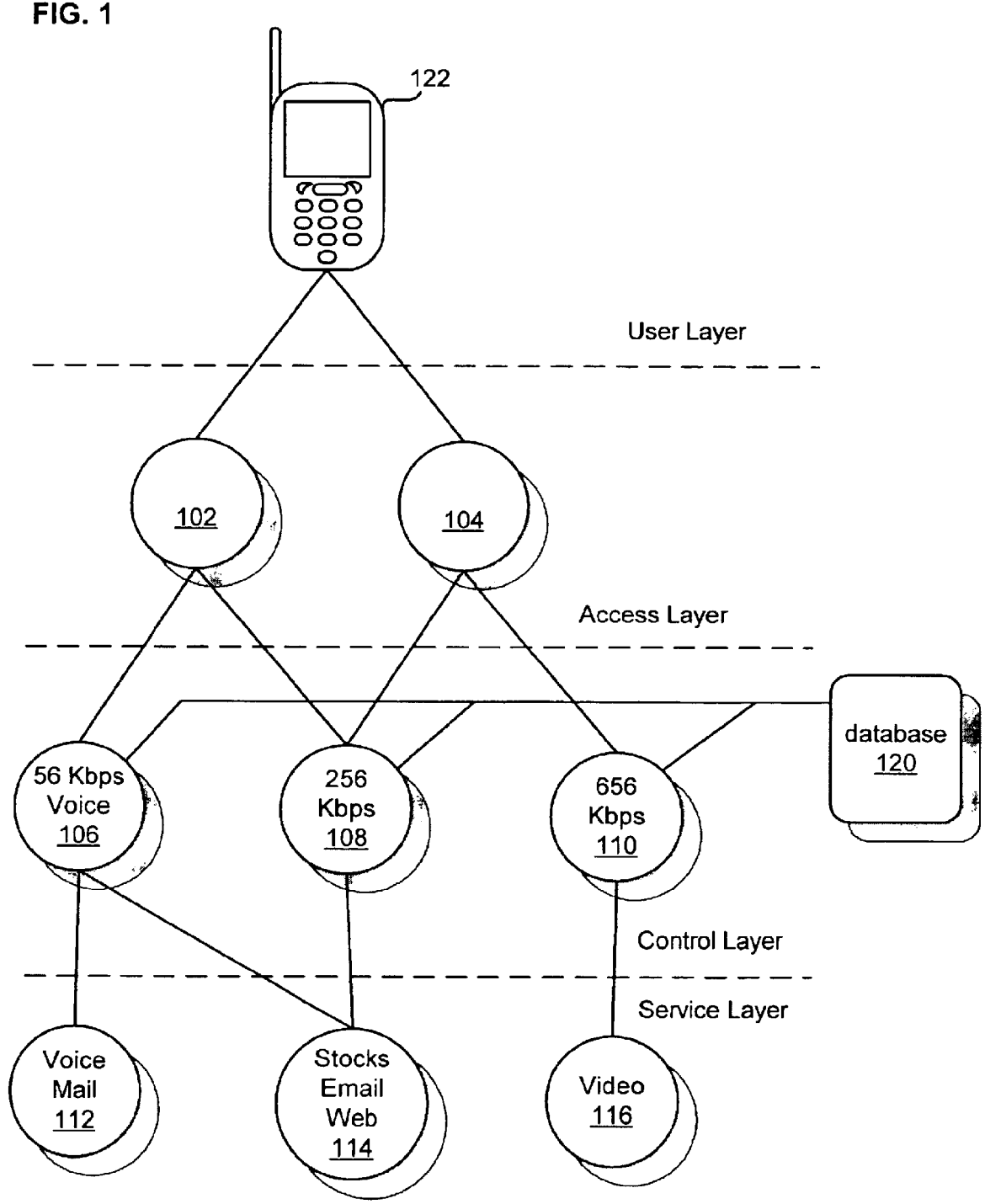
FIG. 1 illustrates an embodiment of a telecommunication network.

With reference to FIG. 1, a user device 122 may access a communication network via access nodes 102, 104. The device 122 may comprise a wireless phone, a personal digital assistant, a laptop or hand-held computer, a game console, or a music player, to name just some of the possibilities. The device may communicate with the access nodes 102, 104 over a wireless transmission (e.g., GPRS, CDMA, PHS, DECT, Satellite, SS7 Gateway, Fiberoptic Multiplexer, Bluetooth, etc.) or a land-line (e.g., DSL, ISP, POTS, etc.). In some cases, a device may be equipped to communicate with an access node using plural communication protocols.

The access nodes 102, 104 are in communication with call control nodes. In the embodiment of FIG. 1, the access node 102 is in communication with the call control nodes 106, 108. The access node 104 is in communication with call control nodes 108, 110. Each of the call control nodes is in communication with a database 120. The database 120 provides a central location for storing and retrieving communication addresses for the device 122, so that the network may locate the device 122 by an identifier such as phone number, MIN, ESN, TMSI, IMSI, or IP address when other devices initiate communication with the device 122. The database is used to locate a subscriber for service terminations (e.g. call, data, etc.) on a global or regional basis (e.g., home location register (HLR), local number portability (LNP), lightweight directory access protocol (LDAP), etc.) In such an embodiment, the device capabilities and features are stored in the devices internal memory. These capabilities and features can be communicated to the network as needed in order to facilitate determining access, control or services as options as described herein. In another embodiment, the database 120 contains profile and configuration information. This profile and configuration information is valuable for example in determining or enhancing access, control, or service capabilities. In one such embodiment, the database also contains a fund guardian address as described in the patent application filed contemporaneously herewith entitled, "Direct Payment Systems," on (date) in application number (APN). Other information that could be stored in the device 122 memory or the database memory comprises call forwarding information, prepaid services information, device capabilities, encryption keys, etc.

In one embodiment, the access nodes communicate with the call control nodes and with the database 120 via the global Internet using Internet-compatible messages and protocols (for example using IP (Internet Protocol)). The access nodes, call control nodes, and the database 120 could also communicate via private networks as well, or through combinations of private networks and the Internet. Although the control layers are referred to in some specific examples herein as "call control" it is envisioned that any equivalent control layer that controls network elements between the access layer and service layer could be used with the disclosed invention.

The call control nodes are also in communication with service nodes. The call control node 106 is in communication with the service nodes 112,114. The call control node 108 is in communication with the service node 114. The call control node 110 is in communication with the service node 116. In one embodiment, the call control nodes communicate with the service nodes via the global Internet using Internet-compatible messages and protocols. The call control nodes and the service nodes could also communicate via private networks as well, or through combinations of private networks and the Internet.

The call control nodes and service nodes may be geographically, even globally, dispersed. The call control nodes and service nodes may be owned and/or operated by a plurality of telecom providers. The nodes may be 'loosely coupled' via the global Internet, e.g. the nodes may be associated and may interoperate via Internet communication.

Figure 2:
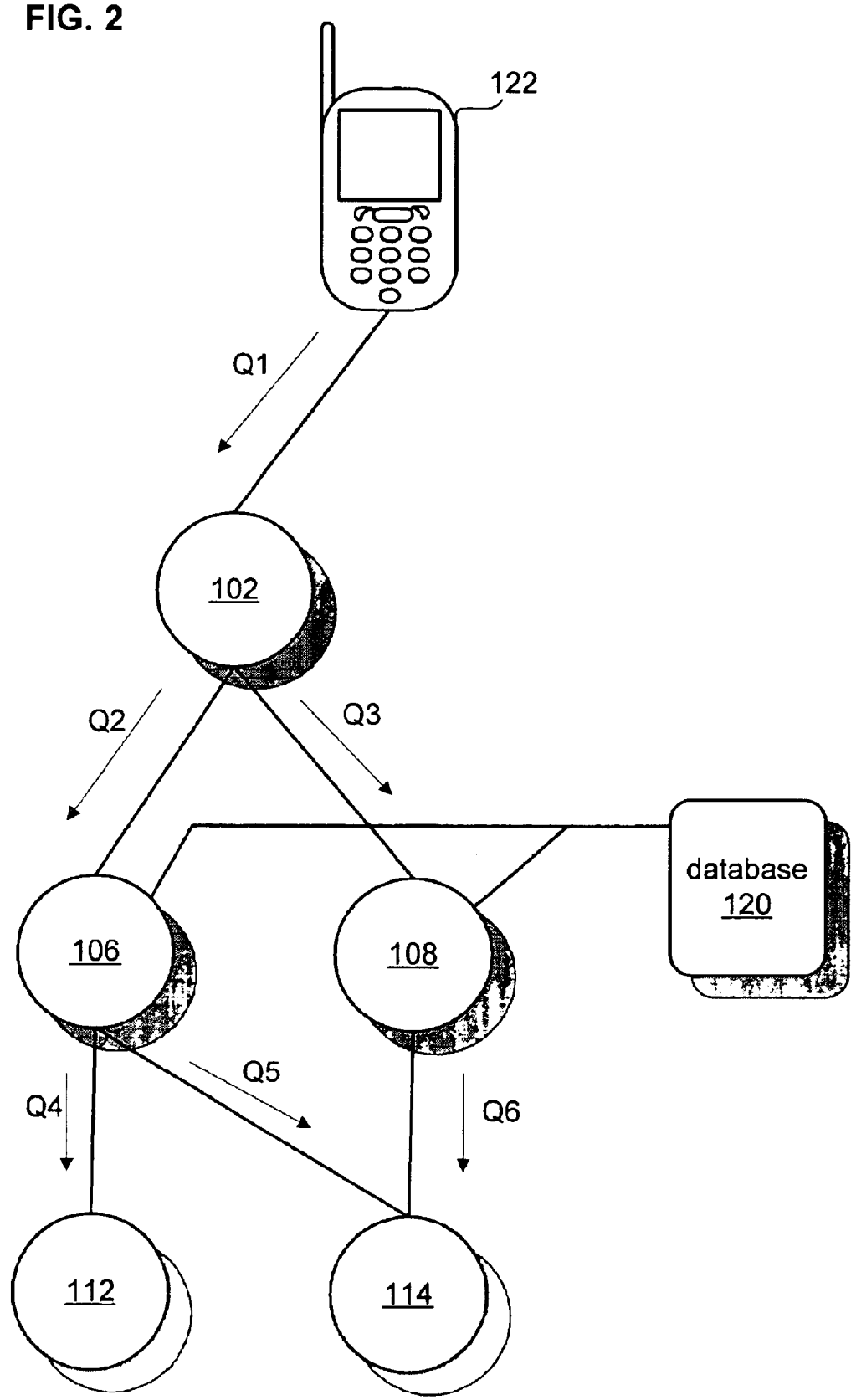
FIG. 2 illustrates a query scenario in an embodiment of a telecommunication network.

With reference to FIG. 2, the device 122 communicates to an access node 102 a query Q1 for capabilities and or costs. The access node 102, in turn, communicates to call control nodes 106,108 the queries Q2 and Q3, respectively, for capabilities and costs. The call control node 106 communicates queries Q4 and Q5 to the service nodes 112,114, respectively, for capabilities and costs. The call control node 108 communicates a query Q6 to the service node 114 for capabilities and costs. The initial query Q1 from the device 122 to the access node 102 may be communicated at a time when the device 122 is first turned on or otherwise activated after a period of inactivity or after a change in the geographic location of the device 122. For example, if the access node is a wireless receiver mounted on a signal tower in City A, and if the device 122 is a wireless phone, the phone may be turned on in City A when its user debarks from an airplane. At or soon after this time, the query Q1 may be communicated from the phone to the wireless receiver.

In general, the "query" Q1 may in fact be any signal from the device 122 to the access node 102, the signal indicating the presence of the device 122 in the region of operation of the access node 102.

Although not shown for purposes of simplicity, the device 122 may also communicate a query similar to Q1 to access node 104. The query to the access node 104 may likewise propagate through the call control and service nodes available via the access node 104 (e.g. those nodes with which the access node 104 may operate). Herein, a node is said to be 'associated with' the nodes with which the node may operate.

Figure 3:
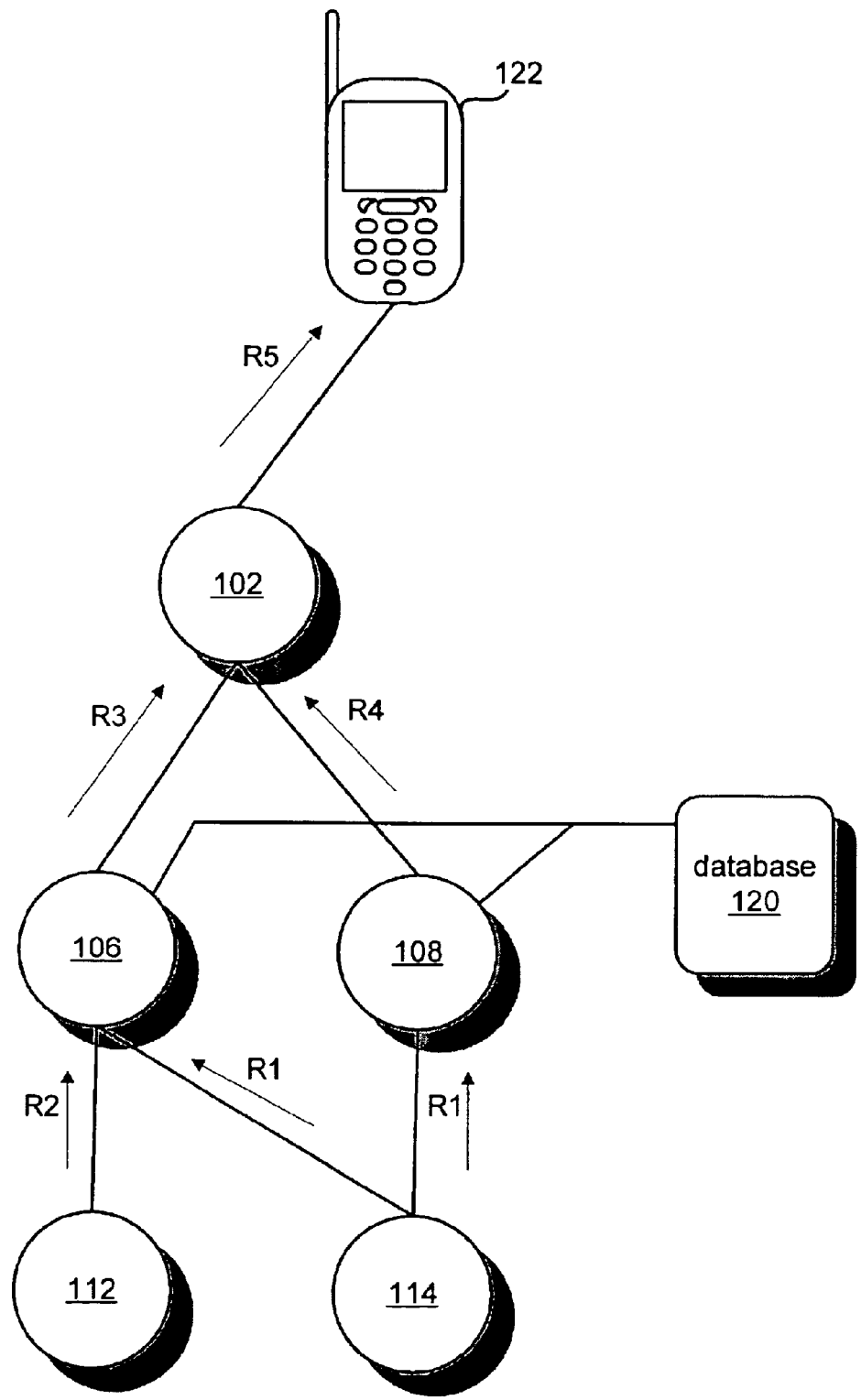
FIG. 3 illustrates a response scenario in an embodiment of a telecommunication network.

With reference to FIG. 3, the service node 114 responds to the queries Q5 and Q6 by communicating a response R1 comprising the capabilities and costs of the service node 114. The response R1 is communicated to the call control nodes 106 and 108. The service node 112 responds to the query Q4 by communicating a response R2 comprising the capabilities and costs of the service node 112. The response R2 is communicated to the call control node 106. A service node could also broadcast price changes to call control nodes. A call control node could also broadcast price changes to access nodes. An access node could inform a user device of available price changes.

The call control node 108 communicates a response R4 to the access node 102. The response R4 comprises the information of response R1 (the costs and capabilities of the service node 114) as well as the costs and capabilities of the call control node 108. The call control node 106 communicates a response R3 to the access node 102. The response R3 comprises the information of responses R1 and R2 (the costs and capabilities of service nodes 112 and 114), as well as the costs and capabilities of the call control node 106.

When responding to a query from a call control node, a service node may adjust its capabilities and costs according to the source of the query. For example, a service node owned and operated by the same vendor as a first call control node may respond to a query from the first call control node with a lower cost, and additional capabilities, than the service node would respond with to a query from a non-coowned/operated call control node. Alternatively, the service node may provide the same response regardless of the source of the query, but the call control node may adjust the capabilities and costs accordingly. Responses between access nodes and call control nodes may be similarly tailored. In a given embodiment, displayed costs and services may be separately itemized for access, control, or service nodes, allowing for example, a selection of the lowest integrated combination by a subscriber.

Access node 102 communicates a response R5 to the device 122. The response R5 comprises the information of responses R3 and R4 as well as the costs and capabilities of the access node 102.

Although not shown for purposes of simplicity, the access node 104 may also communicate a similar response to the device.

Figure 4:
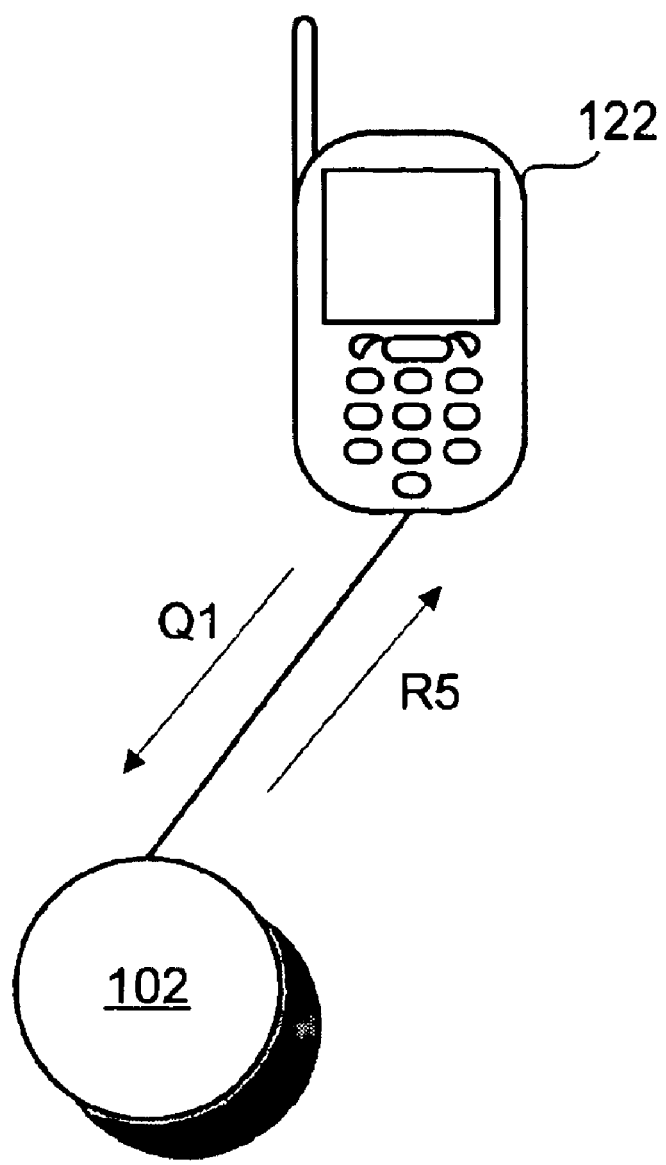
FIG. 4 illustrates a query/response scenario in an embodiment of a telecommunication network.

With reference to FIG. 4, in an alternate embodiment, the access node 102 maintains information about the costs and capabilities of the call control and service nodes with which it may operate. Thus, at the time the device 122 communicates the query Q1, the access node 102 may return the response R5 without communicating queries and receiving responses from the call control and service nodes with which it may operate. Cost information may also be stored in a control node periodically so the information can be returned to an access node R4 without requiring an inquiry to a service nodes each time.

Figure 5:
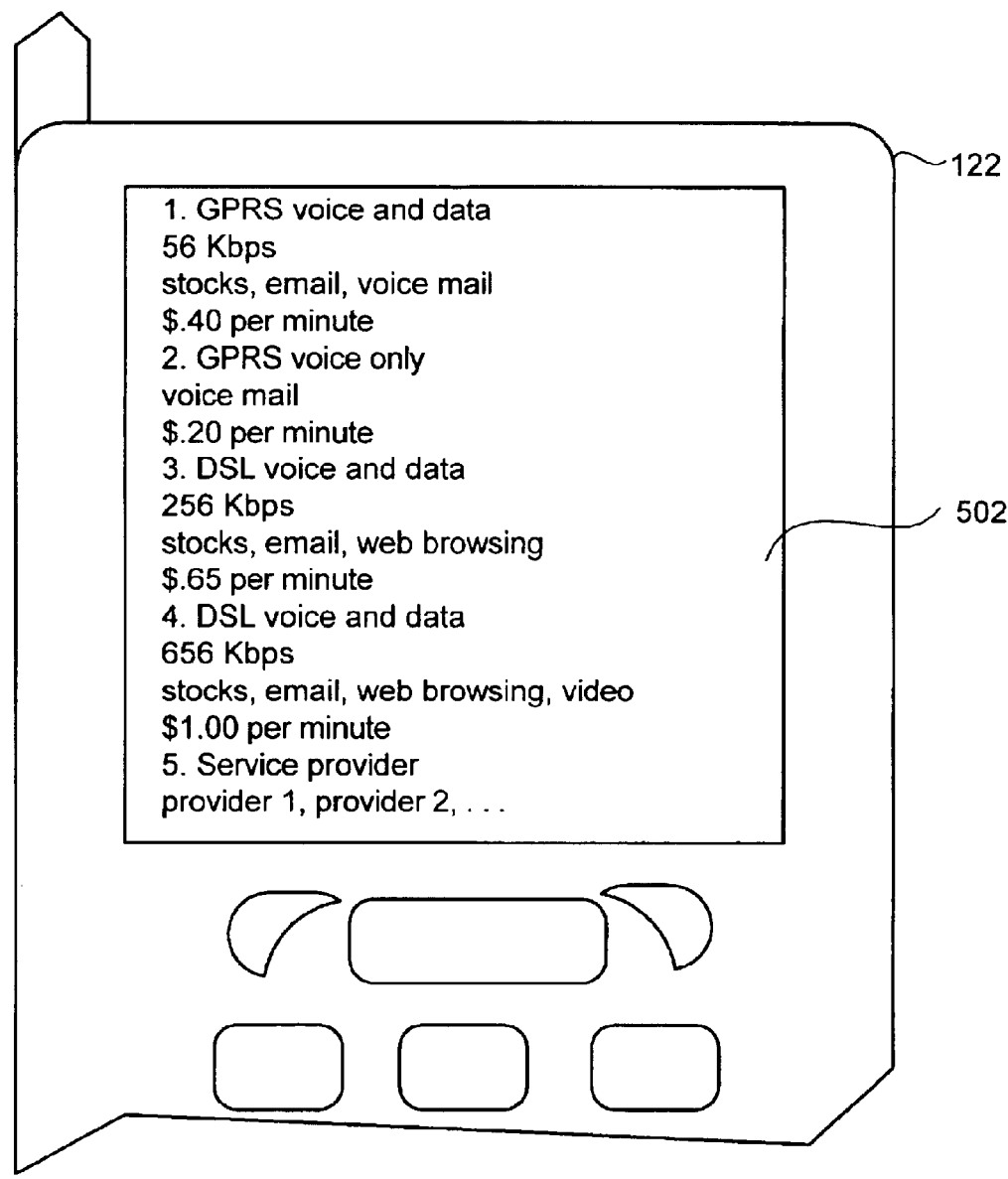
FIG. 5 illustrates a selection list for an embodiment of a telecommunication network.

With reference to FIG. 5, the device 122 displays the information of response R5 as a list of options 502. The options reflect the capabilities and cost information returned in response to the queries. The options include the type of access available (for example, GPRS or DSL), the quality of service (bits per second, voice only, voice and data), and services available (voice mail, stock quotes, email, web browsing, video), and the cost per minute. Of course, this is only one example of the possible cost/capabilities that could be displayed. The options reflect the associations among the access, call control, and service nodes. The device 122 may be configured to automatically select a combination of access, quality, and service based upon the device user's preferences and the costs. Alternatively, the user of the device 122 can select a combination of access, quality, and service from the list. The device may also display a service provider name for one or more of the potential plural services enumerated on the device display. Thus, allowing a user to factor in a reputation of the provider into a selection decision for competing services. Further, a user device may periodically request updated costs and services information from the network, without requiring subscriber initiation. Rules may be set-up by a subscriber to request or select specific services according to a rule set. Rules would be particularly helpful, for example, in periodic network service requests. Upon finding a better or cheaper network configuration, the user layer device could request subscriber authorization (e.g., on a user device display), or auto-authorize an alternative configuration, based on a subscriber established rule set. These rules may be maintained for example, in memory available at the user device, or other network memory (e.g., 120). These rules may be part of the user profile.

Figure 6:
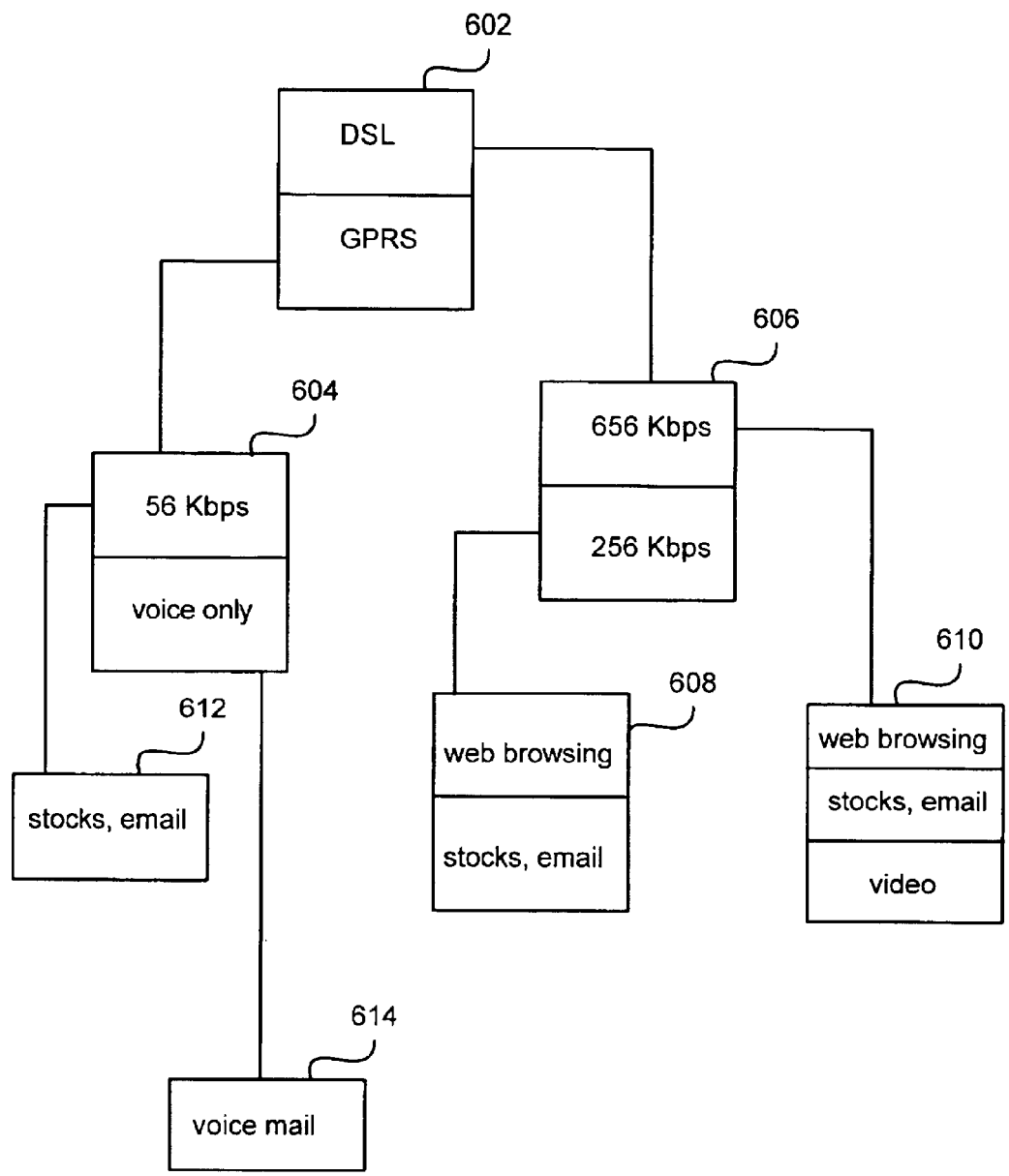
FIG. 6 illustrates a menu hierarchy for an embodiment of a telecommunication network.

With reference to FIG. 6, in an alternate embodiment the device 122 presents the device user with menus from which the user may select access, call control, and service options. In one embodiment, a first menu 602 may present access options. If the user selects DSL as the access option, a next menu 606 presents quality of service (call control) options available for DSL. If the user selects the high-speed option (656 Kbps), a next menu 610 provides service options available at the higher speed. If the user selects the lower-speed option (256 Kbps), a next menu 608 provides service options available at the lower speed. Once the user selects access, call control, and service options, a price of the combination may be determined by the device and presented to the user.

If the user selects GPRS access from the access menu 602, a next menu 604 provides call control options available with GPRS access. If the user selects a 56 Kbps data quality of service, a next menu 612 provides service options available at this data rate. If the user selects voice only quality of service, a next menu 614 presents service options available with voice-only service. Again, once the user selects access, call control, and service options, a price of the combination may be determined by the device and presented to the user. It may be possible in some embodiments to select multiple service options for a selected call control option.

Figure 7:
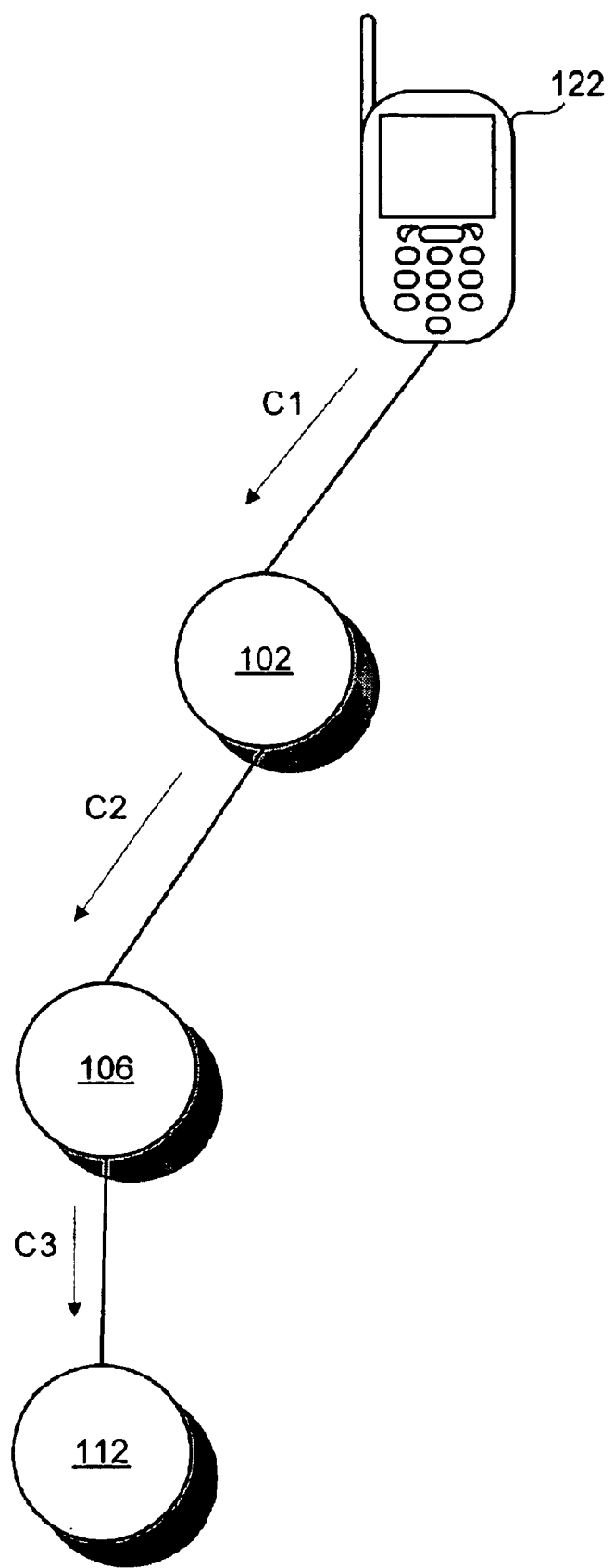
FIG. 7 illustrates a configuration scenario for an embodiment of a telecommunication network.

With reference to FIG. 7, configuration information C1 is communicated from the device 122 to the selected access node 102, according to the user's selection of access, call control, and service options. The access node 102, in turn, communicates configuration information C2 to the node 106 corresponding to the selected call control option. The call control node 106 communicates configuration information C3 to the node 112 corresponding to the selected service or services. In this manner, communication resources are assigned to the mobile device 122 to provide the selected access, call control, and services.

Figure 8:
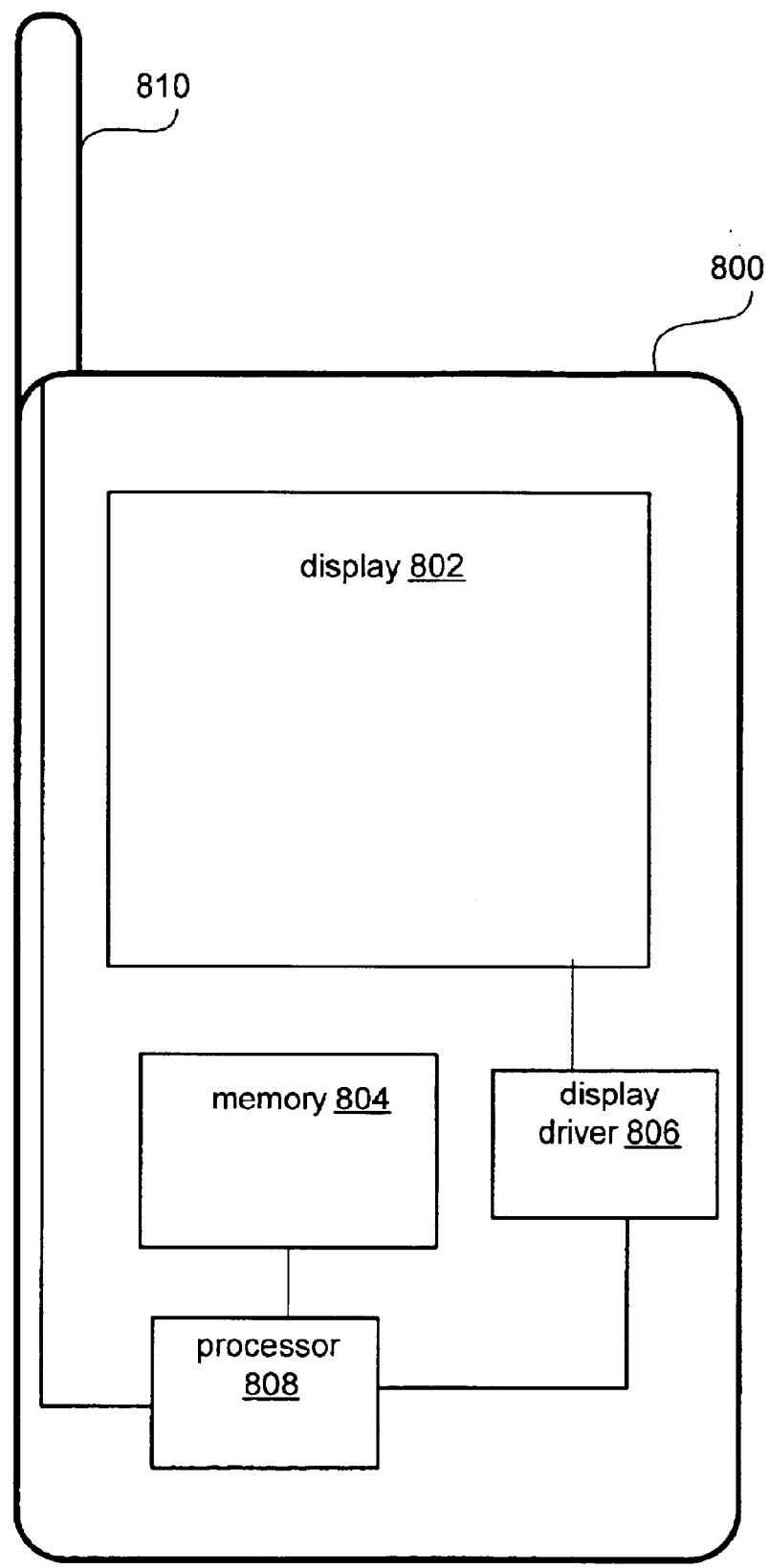
FIG. 8 illustrates an embodiment of a mobile telephone.

With reference to FIG. 8, a wireless telephone embodiment 800 includes an antenna 810 for communicating and receiving wireless signals. The phone 800 further comprises a display 802, display driver logic 806 to operate the display, a processor 808, and a memory 804 to store instructions and data that the processor 808 executes and operates upon, respectively.

The memory 804 may store data representing the character sequences that appear in menus and selections on the display 802. The memory 804 may further store instructions to organize, analyze, and select from options returned in response to queries to the network. The selection of options may be made according to a user profile stored in the memory 804. For example, the user profile could specify that the user always prefers the highest-data-rate quality of service that can be purchased for under $0.75 per minute. The memory 804 may comprise random access memory (RAM), read-only memory (ROM), flash memory, and other storage technologies.

The processor 808 is coupled to the antenna 810 and may operate to send queries to the network for costs and capabilities, and to receive, store, organize, and analyze responses to the queries. The processor 808 may further operate, in accordance with instructions stored in the memory 804, to automatically select access, call control, and service options of the network. The processor 808 may operate in cooperation with the display driver 806 to set the content of the display 802. A device may contain more than one access technology (e.g., GPRS, WiFi, Ethernet, Bluetooth, Infrared, etc.).

Figure 9:
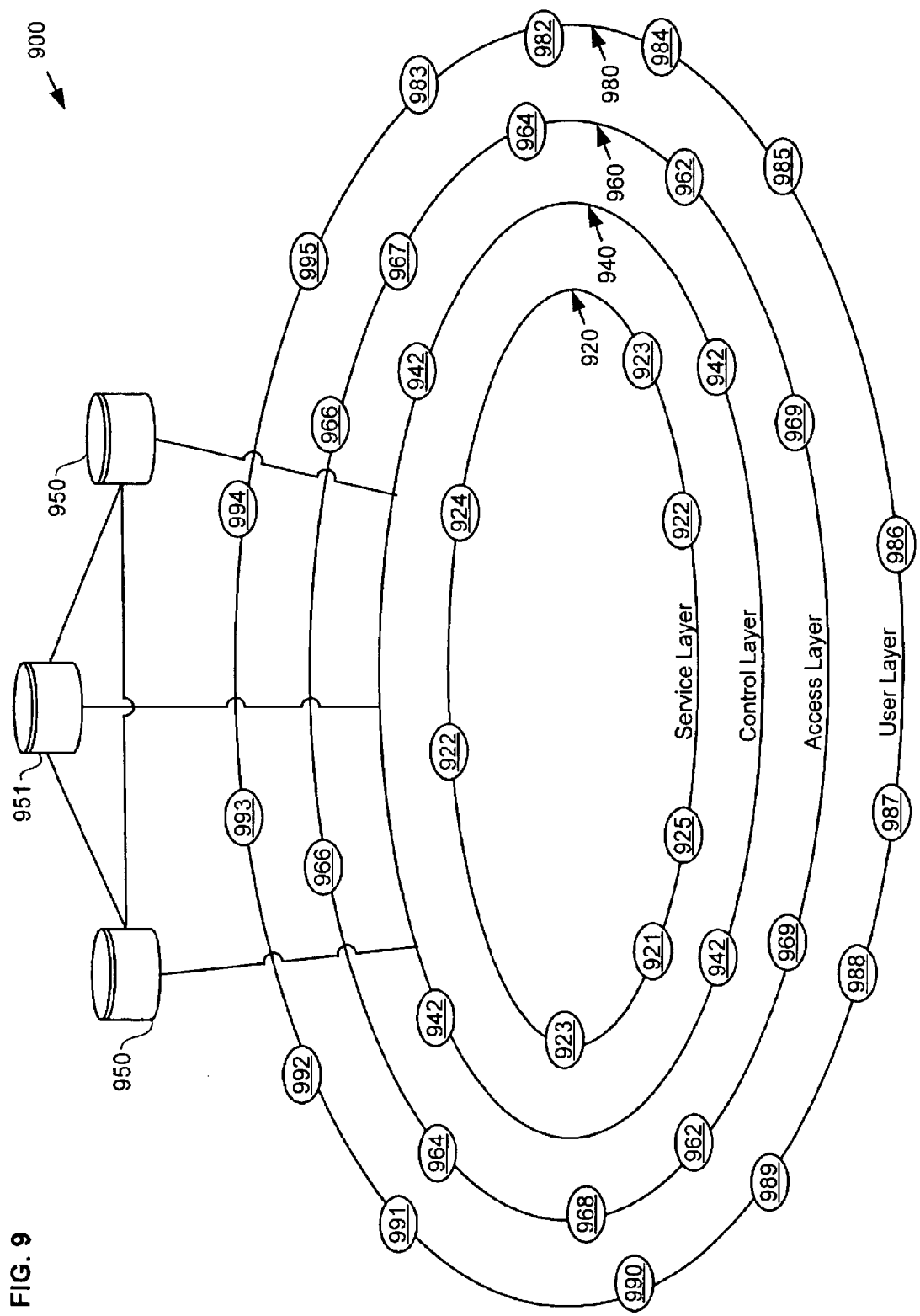
FIG. 9 illustrates a loosely coupled network comprising user, access, control, and service layers.

With reference to FIG. 9, a network configuration 900 is a group of loosely affiliated nodes that allow a subscriber of a user layer 980 device to configure the network 900 with the access 960, control 940, and service 920 layer nodes of their choice. The specific node selection impacts the cost of services. For example, a node on a local network may provide a less expensive alternative than a distant, previously, configured node. The subscriber through a user device (e.g., 982) on the user layer 980 may select nodes when connecting or the subscriber may keep the statically assigned nodes stored in a profile on the global data servers 950–951. In another embodiment, the selected nodes and services may be kept in the user device memory (e.g., RAM, SIM, etc.) available to the user device logic or application responsible for network queries and selection. In other words, an application on the handset can make the decisions. In yet another embodiment, the selected nodes and services are kept in a database contained on or accessible to the network (e.g., a HLR). Information about costs and fees are given to the subscriber when registering. The subscriber is then allowed to change the configuration in real-time based on cost, QOS, and service type availability. In one such embodiment, each such device or node, resides on or has access to the global Internet. In such a case, this logical virtual subscriber network functions at least in part on the Internet. FIG. 9, may also represent a logical architecture, where nodes (or logical capabilities, such as the control and service layer) can be combined in one physical system.

User layer devices may include personal digital assistants (PDAs) 982, pocket organizers 983, digitizers 984, desk-top devices 985, printers 986, laptops 987, fax machines 988, plotters 989, telephones 990, super computers 991, video recorders 992, disk arrays 993, modemed devices 994, mobile phone devices 995, and other devices, any of which may have one or more access technologies, wireless or otherwise. User layer devices may also reside behind private network firewalls with private IP addresses.

Access layer devices may include for example, SS7 Gateways 964, radio towers 962, wireless network nodes 969, satellite dishes 968, fiberoptic multiplexers 966, internet service providers 967, and other access devices and nodes, any of which provides access to a user layer device. Control layer devices include for example, SIP Call Servers 942. Service Layer devices may include prepaid servers 921, media servers 922, portals 923, payment/accounting services 924, and other service platforms 925.

In general, when a device requests service of some type, it communicates with nodes or devices on the adjacent inner circle. For example, the user layer devices 982–995 access the network through access layer devices 962–969. User layer and access layer nodes may communicate as in the case of a mobile wireless device 995 and an access layer radio tower 962. Wireless handoffs are allowed between wireless access devices (e.g., 962, 969, 968, etc.) with the same or different wireless communication protocols, as known in the art. Any specific implementation of a wireless hand-off protocol, or establishing a new wireless access session under a different wireless protocol will not so limit this discussion.

In the case of fixed land based user layer devices, the land-based devices may use an ISP or access provider to gain connectivity to the Internet. Access layer nodes would then communicate with control layer nodes that connect the subscriber to one or more services nodes in the service layer or to other control nodes for a terminating service or call request.

One key concept is that the subscriber has control of his own network configuration, unrestrained by service provider restrictions. In one such case, this freedom is facilitated by a database 950–951 that contains user profile, user configuration, or user location (e.g., for mobile devices) information. In one such implementation, the network is regional in nature, in another implementation the network is global. The database is configured to support the size and speed required for the network implementation. In one such database 950–951 implementation, a central administrative authority 951, helps resolve information location, when data may be contained across multiple data stores 950.

In this dynamic environment a means may be implemented for subscriber payment of selected services. In one case, a subscriber provides a symbolic address and account number (subscriber payment information) of a Payment Server (eWallet, voucher management system, credit card database, bank, private billing provider, etc.) or SCF (Service Control Function, for prepaid, VPN, or other service) so that charges can be recuperated or authorized in real-time. In one implementation, this subscriber payment information is contained within the user layer device. In another case, the subscriber payment information is stored in the database 950–951.

In this dynamic environment, several types of charges can be incurred in this system. A selected network configuration may include for example, the following charges:

1. User layer to Access Layer
2. Access Layer to Control Layer
3. Control Layer to Service Layer
4. User Layer to Service Layer
5. Control Layer to Control Layer
6. User layer to Global Data Central Administrative Authority (database)
7. Originated service request call half
8. Terminating service request call half
9. Reverse charges
10. Toll-free charges
11. $3^{rd}$ party charging Particular embodiments of a method and apparatus have been described herein. Many alternative embodiments will now become apparent to those skilled in the art. It should be recognized that the described embodiments are illustrative only and should not be taken as limiting in scope. Rather, the present invention encompasses all such embodiments as may come within the scope of the following claims and equivalents thereto.

For example, although the access technologies have primarily been discussed in the context of DSL and GPRS/GSM, one skilled in the art will appreciate that there are many suitable equivalent access technologies and that advantages of this invention are not limit to a particular access technology. As a specific example, if CDMA2000 were used as an access technology according to the this invention, then, in reference to FIG. 6, menu 604 might reflect call control options of "1xEV-DO" and 1xEV-DV" rather than "56 kbps" and "voice-only" respectively.

What is claimed is:

1. A method of assigning communication resources for communications services of plural service providers to a mobile device via plural access nodes in a vicinity where the device is operated, the method comprising:

communicating a signal from the device to the plural access nodes available to the device;

receiving from the plural access nodes, control and service options for a plurality of control and service nodes with which the plural access nodes may operate via the access nodes, there being at least one difference in the control and service options available via separate access nodes;

presenting the control and service options to a user of the device; and assigning control and service nodes to use with the device according to a selection received from the device.

2. The method of claim 1, further comprising:

the control and service options including capabilities and costs of service options of multiple telecom providers.

3. The method of claim 2, further comprising:

the control and service options including capabilities and costs of control options of multiple telecom providers.

4. The method of claim 1, further comprising:

selecting access, control, and service options according to a profile of the user.

5. The method of claim 1, further comprising:

communicating selected control and service options to the access node.

6. The method of claim 1 wherein the control options comprise call control options.

7. A method comprising:

signaling from a mobile device to at least two access nodes accessible from the mobile device to request control and service options available through the access nodes;

determining control options associated with the at least two access nodes;

determining service options available with the control options; and communicating to the mobile device combinations of the control and service options available via the access nodes, where the control and service options associated with the access nodes may differ between the access nodes;

wherein the control options comprise call control functions provided by plural telecom service providers.

8. The method of claim 7, further comprising:

performing the acts of claim 6 in response to a signal from the mobile device.

9. The method of claim 7 further comprising:

determining the control and service options prior to receiving a signal from the mobile device; and communicating to the mobile device available combinations of the control and service options in response to receiving the signal.

10. The method of claim 7, further comprising:

querying control nodes that provide the control options;

receiving responses from the control nodes, the responses comprising costs and capabilities of the control options provided by the control nodes;

querying service nodes that provide the service options; and receiving responses from the service nodes, the responses comprising costs and capabilities of the service options provided by the service nodes.

11. The method of claim 7, further comprising:

communicating to the mobile device indications of which control options are associated with which service options.

12. The method of claim 7 wherein the control options further comprise call control options.

13. A mobile telephone, comprising:

a processor; and a memory comprising instructions which, when executed by the processor, result in signaling from the mobile telephone to plural access nodes in a manner that causes the plural access nodes to provide capability and cost information for a plurality of call control and service options available through the plural access nodes, the call control and service options differing in at least one respect between at least two of the access nodes;

presenting the capability and cost information to a user of the mobile telephone; and communicating to an access node a selection of call control and service options to use with the mobile telephone.

14. The mobile telephone of claim 13, further comprising instructions which, when executed, further result in:

presenting the capability and cost information to a user of the mobile telephone in a manner that relates the service options with the call control options with which the service options are associated.

15. A mobile device, comprising:

a display, for displaying information to a user;

a processor coupled to the display; and memory accessible by the processor, comprising instructions which when executed by the processor, result in signaling from the mobile device to at least two access nodes accessible from the mobile device to request network configuration options available through the access nodes;

retrieving network configuration information; and displaying network configuration options to the user;

wherein the network configuration information comprises plural available telecom providers supporting call control functions supporting wireless transmissions between the mobile device and a wireless network via the at least two access nodes.

16. The mobile device of claim 15, further comprising instructions in memory which when executed result in:

transmitting the user's network configuration selection to an access node.

17. The mobile device of claim 15, further comprising instructions in memory which when executed result in:

retrieving an update of network configuration information.

18. The mobile device of claim 17, further comprising instructions in memory which when executed result in:

transmitting a network configuration change to an access node based on the update of network configuration information.

19. The mobile device of claim 17, wherein the update is retrieved without subscriber initiation.

20. The mobile device of claim 15, wherein the displayed network configuration options itemize at least two of the following charges:

an access layer rate;

a control layer rate; or a service layer rate.

* * * * *